United States Patent
Rebmann

[11] Patent Number: 5,947,223
[45] Date of Patent: Sep. 7, 1999

[54] RESTRAINT FOR A DRIVE ASSEMBLY OF A MOTOR VEHICLE

[75] Inventor: Rolf Rebmann, Stuttgart, Germany

[73] Assignee: Dr. Ing. h.c.F. Porsche AG, Weissach, Germany

[21] Appl. No.: 08/833,475

[22] Filed: Apr. 7, 1997

[30] Foreign Application Priority Data

Apr. 6, 1996 [DE] Germany .................. 196 13 870

[51] Int. Cl.$^6$ .................. B60K 5/00; B60K 1/00
[52] U.S. Cl. .................. 180/232; 180/291
[58] Field of Search .................. 180/232, 291, 180/312; 280/784

[56] References Cited

U.S. PATENT DOCUMENTS 4,836,321  6/1989  Baumann .
5,466,006  11/1995  Neumann .

FOREIGN PATENT DOCUMENTS 0 566 840 A1  10/1993  European Pat. Off. .
0 598 685 A1   5/1994  European Pat. Off. .
31 41 164 A1   4/1983  Germany .
42 30 669 A1   3/1994  Germany .

*Primary Examiner*—Lanna Mai
*Assistant Examiner*—Jeff Restifo
*Attorney, Agent, or Firm*—Evenson, McKeown, Edwards & Lenahan, P.L.L.C.

[57] ABSTRACT

A restraint for a drive assembly, especially for a mid-engine of a motor vehicle, uses a cable restraint that is connected with a member of the body structure as well as a housing of the drive assembly. The cable restraint is designed as a loop and is fastened by its two free ends using a clamping device in a cross member of the vehicle body structure, and a loop arc of the cable can be placed in a holder that is connected with a crankcase of the drive assembly.

16 Claims, 3 Drawing Sheets

RESTRAINT FOR A DRIVE ASSEMBLY OF A MOTOR VEHICLE

BACKGROUND AND SUMMARY OF THE INVENTION

The invention relates to a restraint for a drive assembly of a motor vehicle, and more particularly to a restraint which is connected to a vehicle body structure and to a vehicle engine. The invention also relates to a method of restraining a drive assembly of a motor vehicle.

This application claims the priority of Germany application no. 196 13 870.1 filed in Germany on Apr. 6, 1996, the disclosure of which is expressly incorporated by reference herein.

A restraining strip between a vehicle front engine and a vehicle body is known from Baumann, U.S. Pat. No. 4,836,321, in which one end of the strip is fixed to the engine and the other end of the strip is fixed to the body. The strip is stretched to support the engine following partial deformation of the body structure.

A goal of the invention is to provide a restraint for a drive assembly of a motor vehicle that can be mounted in simple fashion and ensures a guided movement of the assembly in the event of a collision.

This and other goals have been achieved according to the present invention by providing a restraint for a drive assembly of a motor vehicle, comprising: a cable having two ends; at least one clamping device connected to a vehicle body cross member, the two ends of the cable being fastened in the clamping device such that the cable forms a loop arc; and a holder connected with an engine, the holder receiving the loop arc.

This and other goals have also been achieved according to the present invention by providing a method of restraining a drive assembly of a motor vehicle, comprising the steps of: (a) coupling two ends of a cable to a vehicle body structure such that said cable forms a loop arc; and (b) coupling said loop arc to a vehicle drive assembly.

The present invention advantageously restrains the drive assembly of a mid-engine, located immediately behind the seat, in a safe position during a collision via the cable restraint, preventing vehicle occupants from being endangered. The cable restraint is located in a position such that oscillating movements of the drive assembly are permitted while the drive assembly is held essentially in its mounting position or in a tilted position.

The cable restraint is installed in simple fashion, with its free ends being mounted separately and at a distance from one another in a cross member of the vehicle body. A cable loop is secured in a holder which is mounted endwise on the engine crankcase with bolts.

The mount can be preassembled and the cable then simply inserted. A tubular sleeve that receives the cable loop in the vicinity of the mount serves for improved retention and guidance of the cable in this area and for protection of the cable.

The connection to the cross member is made by a clamping device in which the cable ends are held in clamping sleeves independently of one another. These sleeves have threaded sections at the ends so that a mounted threaded nut can be tightened as required on the cross member to compensate for tolerances.

Because the connection of the assembly to the cable restraint is located far to the rear relative to the mid-engine drive assembly, tilting can occur in a collision in conjunction with possible limited lengthwise displacement so that in no event can a shift occur that is so extensive that the drive assembly extends into the seats after a collision.

Other objects, advantages and novel features of the present invention will become apparent from the following detailed description of the invention when considered in conjunction with the accompanying drawings.

DETAILED DESCRIPTION OF THE DRAWINGS

Figure 1:
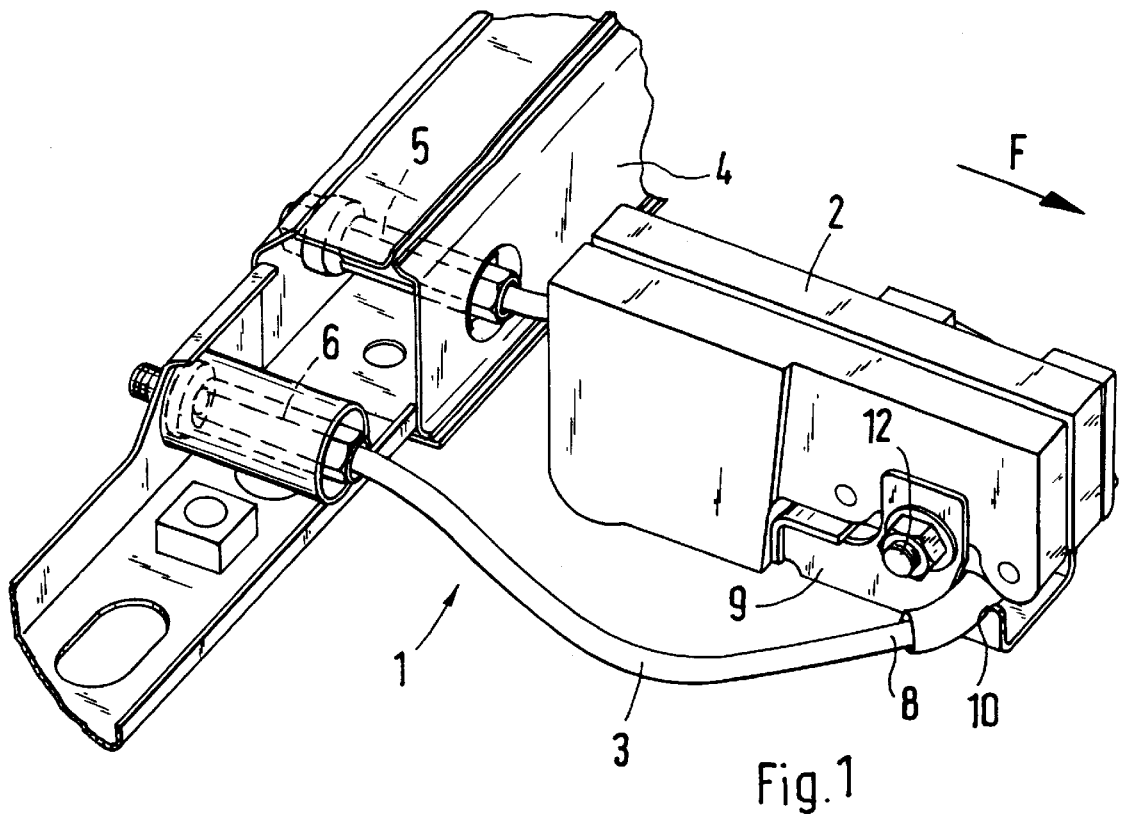
FIG. 1 is a perspective view of a restraint for a drive assembly according to a preferred embodiment of the present invention.
Figure 2:
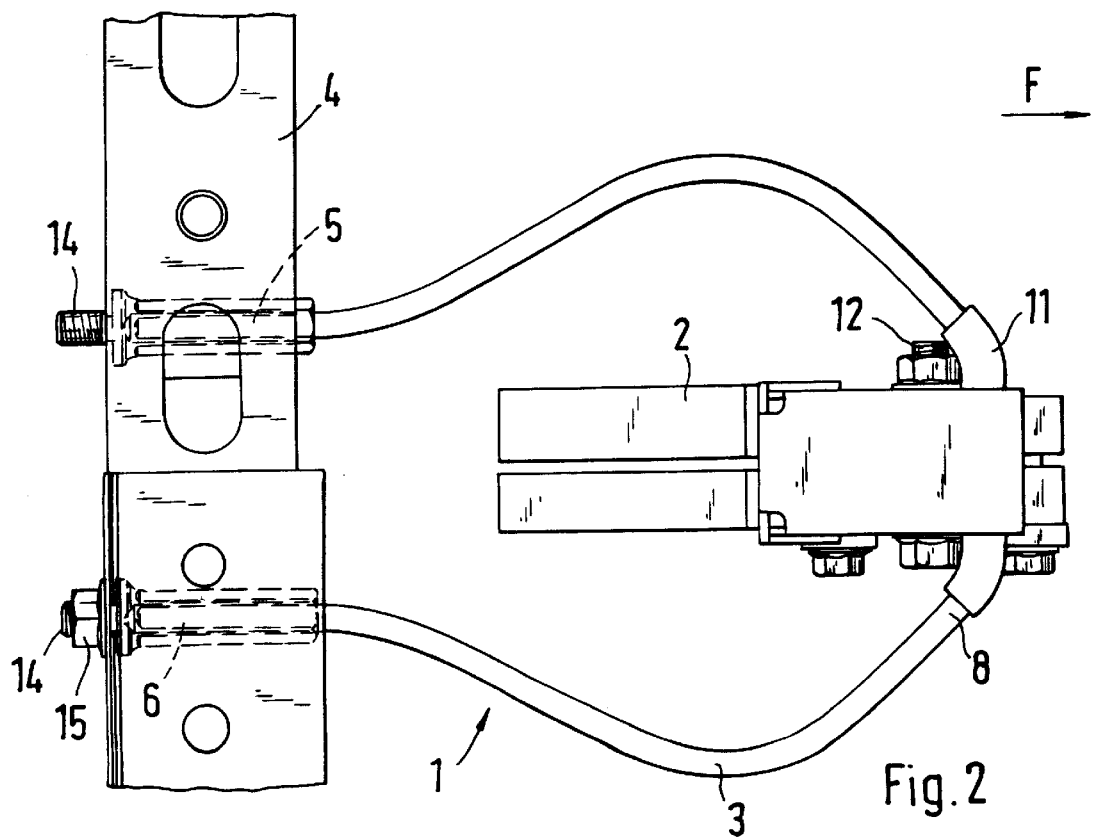
FIG. 2 is a top view of the restraint of FIG. 1.
Figure 3:
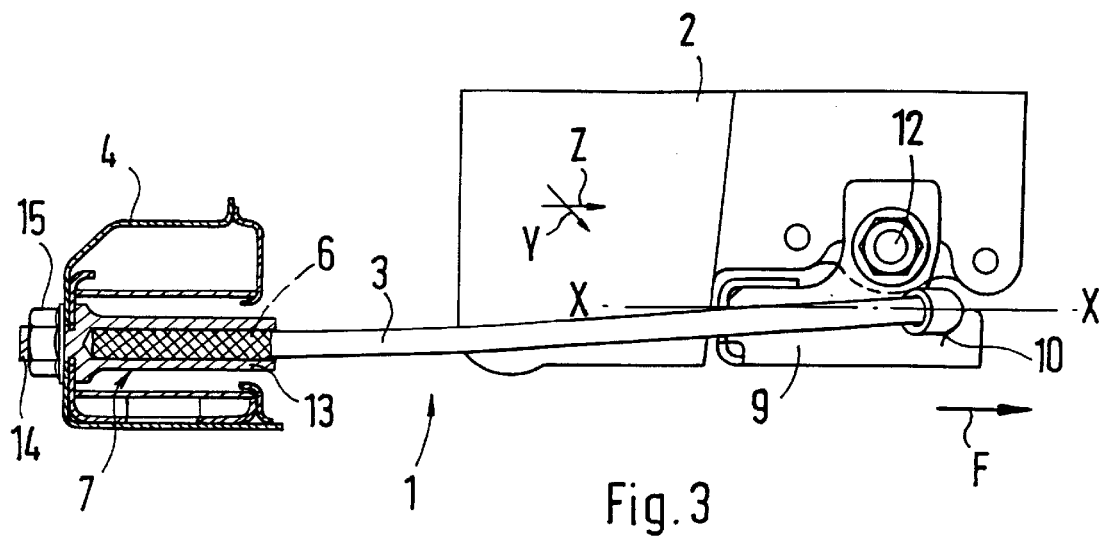
FIG. 3 is a side view of the restraint of FIG. 1 showing the tightening device on the cross member of the vehicle body in cross section.
Figure 4:
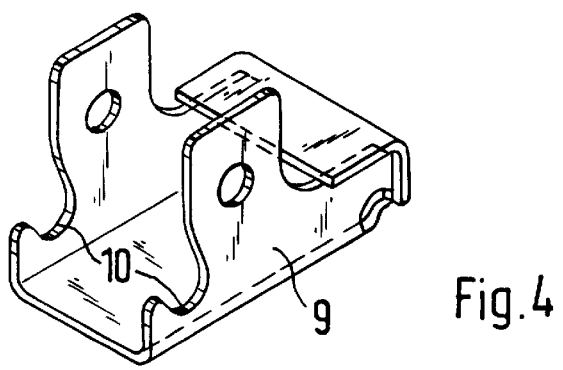
FIG. 4 is a perspective view of the holder of FIG. 1.
Figure 5:
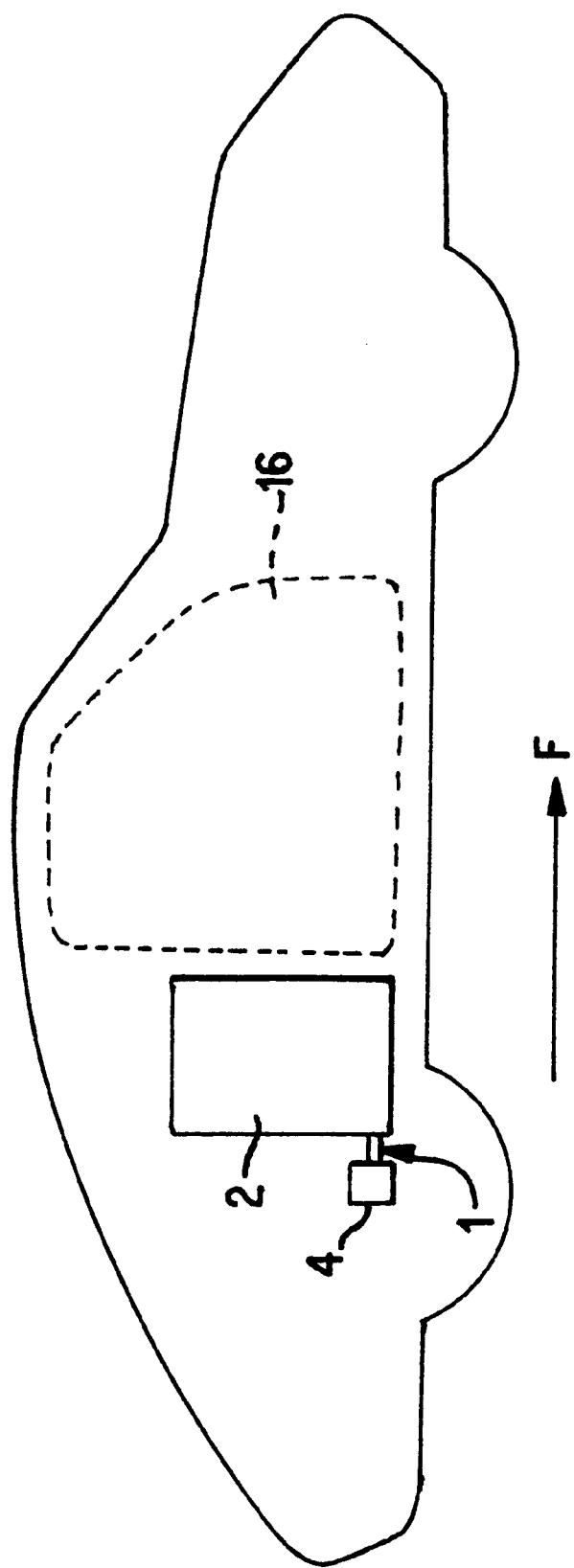
FIG. 5 is a schematic lateral view of a vehicle with the restraint of FIG. 1.

A restraint 1 for a drive assembly 2, especially for a mid-engine which is located immediately behind the seats in a vehicle passenger compartment 16 (see FIG. 5) as viewed in direction of travel F, essentially comprises a cable restraint 3 which is mounted or secured on a cross member 4 and on drive assembly 2.

Cable restraint 3 is made in the form of a loop and is mounted by its two free ends 5, 6 attached separately to cross member 4 via a clamping device 7. Loop arc 8 is placed in a recess 10, open toward the top, in a holder 9. A tubular sleeve 11 is slipped over loop arc 8, said sleeve extending beyond holder 9. The tubular sleeve 11 improves the retention of the cable restraint 3 in the holder 9, and protects the cable restraint against wear.

Holder 9 consists of a sheet metal part that is U-shaped in cross section and whose legs have holes to receive a mounting bolt 12. Recesses 10 for cable 3 or tubular sleeve 11 are provided in the offset areas of the legs. Holder 9 is secured to the crankcase of drive assembly 2 on the lengthwise central axis of the assembly by mounting bolt 12.

The free ends of cable restraint 3 are squeezed in a clamping sleeve 13 to secure them. The sleeve has a threaded extension 14 at the free end onto which a threaded nut 15 can be screwed to secure cable restraint 3 to cross member 4.

The crankcase of drive assembly 2 is only shown partially, with the rest of the engine being located in front of the crankcase in the direction of travel F so that the mounting location for cable 3 is located relatively far back with respect to drive assembly 2. As a result, in a collision the drive assembly is restrained by the restraint 1, allowing only a limited lengthwise movement in the direction of travel F and simultaneously causing a downward tilting movement of the drive assembly toward the vehicle floor. The position of the mounting location in holder 9 is in a plane X—X located above the position of clamping device 7, to facilitate the downward movement of the drive assembly. The holder 9 is mounted below the center of gravity of the drive assembly 2 to facilitate the downward movement of the drive assembly.

Cable restraint 3 has a limited amount of slack between its mounting locations on cross member 4 and the mounting location on holder 9, to allow an oscillating movement of the drive assembly during operation.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A restraint for a drive assembly of a motor vehicle, comprising a cable having two ends, said two ends of the cable being coupled to a vehicle body structure such that said cable forms a loop arc, said loop arc being coupled to a vehicle drive assembly via a holder, said holder having a U-shaped cross section and legs that are mounted on the vehicle drive assembly, said legs defining recesses for receiving the loop arc.

2. A restraint for an engine of a motor vehicle, comprising:
   a cable having two ends;
   at least one clamping device connected to a vehicle body cross member, said two ends of the cable being fastened in said clamping device such that said cable forms a loop arc; and
   a holder connected with an engine, said holder having a U-shaped cross section and legs that are mounted on the engine, said legs defining recesses for receiving said loop arc.

3. A restraint according to claim 2, wherein said engine is a mid-engine located rearward of a vehicle passenger compartment.

4. A restraint according to claim 2, wherein said cable has a predetermined length of slack between the clamping device and the holder.

5. A restraint according to claim 2, further comprising a tubular sleeve arranged on the exterior of the loop arc and placed in at least one of said recesses of the holder.

6. A restraint according to claim 2, wherein said legs are mounted on the engine via a bolt.

7. A restraint according to claim 5, wherein said legs are mounted on the engine via a bolt.

8. A restraint according to claim 2, wherein said recesses are located ahead of the cross member relative to a direction of vehicle travel, said recesses being located in a plane located above the clamping device.

9. A restraint according to claim 5, wherein said recesses are located ahead of the cross member relative to a direction of vehicle travel, said recesses being located in a plane located above the clamping device.

10. A restraint according to claim 6, wherein said recesses are located ahead of the cross member relative to a direction of vehicle travel, said recesses being located in a plane located above the clamping device.

11. A restraint according to claim 2, wherein said holder is located approximately at an end of a crankcase of the engine, said holder including recesses for receiving said loop arc, said recesses being designed such that the engine is movable in a combined limited lengthwise and downward tilting motion during a collision.

12. A restraint according to claim 5, wherein said holder is located approximately at an end of a crankcase of the engine, said recesses being designed such that the engine is movable in a combined limited lengthwise and downward tilting motion during a collision.

13. A restraint according to claim 10, wherein said holder is located approximately at an end of a crankcase of the engine, said recesses being designed such that the engine is movable in a combined limited lengthwise and downward tilting motion during a collision.

14. A restraint according to claim 1, wherein said legs are mounted on the vehicle drive assembly via a bolt.

15. A restraint for an engine of a motor vehicle, comprising:
   a vehicle body cross member located a distance from a vehicle passenger compartment in a longitudinal direction of the vehicle;
   an engine located between said vehicle body cross member and said vehicle passenger compartment relative to said longitudinal direction;
   a cable having two ends;
   at least one clamping device connected to said vehicle body cross member, said two ends of the cable being fastened in said clamping device such that said cable forms a loop arc; and
   a holder connected with said engine, said holder having a U-shaped cross section and legs that are mounted on the engine, said legs defining recesses for receiving said loop arc.

16. A restraint according to claim 15, wherein said engine is a mid-engine located rearward of said vehicle passenger compartment.

* * * * *